US012316702B2

(12) United States Patent
Agarwal et al.

(10) Patent No.: US 12,316,702 B2
(45) Date of Patent: *May 27, 2025

(54) EFFICIENT VIRTUAL IP ADDRESS MANAGEMENT FOR SERVICE CLUSTERS

(71) Applicant: Nutanix, Inc., San Jose, CA (US)

(72) Inventors: Harshit Agarwal, Newark, CA (US); Tabrez Parvez Memon, Campbell, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,963

(22) Filed: Feb. 5, 2024

(65) Prior Publication Data

US 2024/0187479 A1    Jun. 6, 2024

Related U.S. Application Data

(63) Continuation of application No. 17/135,084, filed on Dec. 28, 2020, now Pat. No. 11,917,001.

(Continued)

(51) Int. Cl.
*H04L 67/60* (2022.01)
*H04L 43/0817* (2022.01)
(Continued)

(52) U.S. Cl.
CPC ...... *H04L 67/1034* (2013.01); *H04L 43/0817* (2013.01); *H04L 43/12* (2013.01);
(Continued)

(58) Field of Classification Search
CPC . H04L 67/1034; H04L 43/0817; H04L 43/12; H04L 61/103; H04L 67/1036;
(Continued)

(56) References Cited

U.S. PATENT DOCUMENTS 6,971,044 B2   11/2005  Geng et al.
8,549,518 B1   10/2013  Aron et al.
(Continued)

FOREIGN PATENT DOCUMENTS

JP         7073475 B2     5/2022

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Schquita D Goodwin

(57) ABSTRACT

One embodiment of the present invention provides a system that can manage access to a service from a cluster of computing nodes. An instance of the system can operate on a respective computing node. During operation, the system instance can identify an Internet Protocol (IP) address, which provides access to the service from the cluster of computing nodes to a client device at a client site. The system instance can select the computing node for hosting the IP address in the cluster of computing nodes based on a set of selection criteria. The selection is performed independently at the computing node. The system instance can then assign the IP address to the computing node. The assignment allows a request for the service to be directed to the computing node. Subsequently, the system instance can facilitate the service from the cluster of computing nodes based on the request.

20 Claims, 12 Drawing Sheets

Related U.S. Application Data

(60) Provisional application No. 62/970,105, filed on Feb. 4, 2020.

(51) Int. Cl.
*H04L 43/12* (2022.01)
*H04L 61/103* (2022.01)
*H04L 67/1034* (2022.01)
*H04L 67/1036* (2022.01)
*H04L 67/563* (2022.01)
*H04L 101/622* (2022.01)

(52) U.S. Cl.
CPC ........ *H04L 61/103* (2013.01); *H04L 67/1036* (2013.01); *H04L 2101/622* (2022.05)

(58) Field of Classification Search
CPC . H04L 2101/622; H04L 61/58; H04L 67/563; H04L 61/5007; H04L 69/325; H04L 41/0668; H04L 69/321; H04L 69/324; H04L 41/0893
See application file for complete search history.

(56) References Cited

U.S. PATENT DOCUMENTS

| | | | |
|---|---|---|---|
| 8,601,473 | B1 | 12/2013 | Aron et al. |
| 8,850,130 | B1 | 9/2014 | Aron et al. |
| 9,772,866 | B1 | 9/2017 | Aron et al. |
| 10,516,568 | B2 | 12/2019 | Jain et al. |
| 10,601,887 | B2 * | 3/2020 | Knox .................... H04L 65/765 |
| 11,252,148 | B2 * | 2/2022 | Zeng .................... H04L 63/0853 |
| 11,765,219 | B2 * | 9/2023 | Gordon .............. H04N 21/2402 709/219 |
| 2017/0237808 | A1 * | 8/2017 | Kodaypak ............. H04L 67/101 709/203 |
| 2018/0067780 | A1 * | 3/2018 | Noda .................... G06F 9/5077 |
| 2019/0372847 | A1 * | 12/2019 | Huh ........................ H04L 63/10 |
| 2020/0057676 | A1 * | 2/2020 | Vaikar ..................... H04L 67/02 |
| 2020/0252459 | A1 * | 8/2020 | Bhatia ..................... G06F 9/542 |
| 2020/0374281 | A1 * | 11/2020 | Zeng .................... G06F 9/45529 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Poitras, Steven. "The Nutanix Bible" (Jul. 25, 2019), from https://nutanixbible.com/ pp. all.

Poitras, Steven. "The Nutanix Bible" (Sep. 17, 2019), from https://nutanixbible.com/ pp. all.

Cano, Ignacio et al. "Curator: Self-Managing Storage for Enterprise Clusters"; University of Washington; published Mar. 2017; pp. all.

Poitras, Steven. "The Nutanix Bible" (Jan. 21, 2020), from https://nutanixbible.com/ pp. all.

Poitras, Steven. "The Nutanix Bible" (Sep. 14, 2020), from https://nutanixbible.com/ pp. all.

Poitras, Steven. "The Nutanix Bible" (Dec. 31, 2020), from https://nutanixbible.com/ pp. all.

Poitras, Steven. "The Nutanix Bible" (Jul. 27, 2022), from https://nutanixbible.com/ pp. all.

Poitras, Steven. "The Nutanix Bible" (Jan. 16, 2024), from https://nutanixbible.com/ pp. all.

Citrix XenDesktop 7.1 on Microsoft Hyper-V Server 2012 R2 on Nutanix Virtual Computing Platform, Solution Design, Jun. 25, 2014.

Poitras, Steven. "The Nutanix Bible" (Jan. 31, 2024), from https://nutanixbible.com/ pp. all.

* cited by examiner

EFFICIENT VIRTUAL IP ADDRESS MANAGEMENT FOR SERVICE CLUSTERS

RELATED APPLICATIONS

This application is a continuation of U.S. application Ser. No. 17/135,084, titled "Efficient Virtual IP Address Management for Service Clusters," by inventors Harshit Agarwal and Tabrez Parvez Memon, filed 28 Dec. 2020, which claims the benefit of U.S. Provisional Application No. 62/970,105, titled "Unified Scale-Out Virtual IP," by inventors Harshit Agarwal and Tabrez Memon, filed 4 Feb. 2020, the disclosure of which is incorporated by reference herein.

BACKGROUND

Field

The present disclosure relates to traffic forwarding in a communication network. More specifically, the present disclosure relates to managing a virtual Internet Protocol (IP) address for service clusters.

Related Art

As Internet traffic is becoming more diverse, cluster-based services are becoming progressively more important as a value proposition for distributed systems. In addition, the evolution of virtualized computing has made a multi-client environment attractive and, consequently, placed additional requirements on the distributed systems. For example, a large number of devices (e.g., servers and service appliances) can be clustered as a service cluster. Each device can facilitate one or more services. The same service cluster can then be configured to serve a large number of clients. It is often desirable that the distributed systems can facilitate an infrastructure that can allow each client to easily configure the service cluster at the client site.

Typically, a respective interface of a device in a service cluster can be configured with an IP address. To access the service provided by the service, a computing device at the client site may initiate a request using the IP address. If the service cluster includes a large number of devices, the service cluster can be associated with a large number of IP addresses. Consequently, a respective client device may be configured with this large number of IP addresses. If an IP address is changed, the corresponding changes in configuration can be propagated to a respective client device. Such changes can be time-intensive and error-prone.

While a service cluster brings many desirable features in facilitating services over the Internet, some issues remain unsolved in efficiently managing the access to the service cluster.

SUMMARY

One embodiment of the present invention provides a system that can manage access to a service from a cluster of computing nodes. An instance of the system can operate on a respective computing node. During operation, the system instance can identify an Internet Protocol (IP) address, which provides access to the service from the cluster of computing nodes to a client device at a client site. The system instance can select the computing node for hosting the IP address in the cluster of computing nodes based on a set of selection criteria. The selection is performed independently at the computing node. The system instance can then assign the IP address to the computing node. The assignment allows a request for the service to be directed to the computing node. Subsequently, the system instance can facilitate the service from the cluster of computing nodes based on the request.

In a variation on this embodiment, the system instance can assign the IP address to the computing node in response to determining that the IP address is not duplicated in the cluster of computing nodes and the client site by sending a probe message.

In a variation on this embodiment, the system instance can send a gratuitous address resolution protocol (ARP) request with the IP address to the client site for clearing a respective local ARP cache.

In a variation on this embodiment, the system instance can monitor the service at the computing node based on a monitoring service, which can monitor the operational status of a respective service provided by the cluster of computing nodes. Upon determining a disruption to the service, the system instance can un-host the IP address from the first computing node. The un-hosting allows a second computing node in the cluster of computing nodes to host the IP address.

In a further variation, the computing node can remain operational and accessible from the client site while the service is disrupted.

In a further variation, the system instance can determine a disruption to the monitoring service and perform a fail-safe operation. The fail-safe operation can include one or more of: restarting the monitoring service and un-hosting the IP address from the computing node.

In a variation on this embodiment, the system instance can determine that a second computing node in the cluster of computing nodes is selected as a service leader for the service. The service leader can be responsible for responding to a respective request for the service. The system instance can then un-host the IP address from the first computing node. The un-hosting allows the second computing node to host the IP address.

In a variation on this embodiment, the system instance may facilitate the service from the cluster by providing the service from the computing node and operating the computing node on a service path of the request. The system instance may also facilitate the service from the cluster by redirecting the request to a second computing node capable of providing the service.

In a variation on this embodiment, the IP address can be a virtual IP address floating among the cluster of computing nodes. The system instance can then receive an ARP request for the IP address and sending an ARP response comprising a media access control (MAC) address of the computing node.

In a variation on this embodiment, wherein the IP address is associated with one of: (i) the service such that a service provided by the cluster of computing nodes is associated with a corresponding IP address; and (ii) a respective service provided by the cluster of computing nodes, thereby unifying service access from the cluster of computing nodes based on the IP address.

BRIEF DESCRIPTION OF THE FIGURES

In the figures, like reference numerals refer to the same figure elements.

DETAILED DESCRIPTION

Figure 1A:
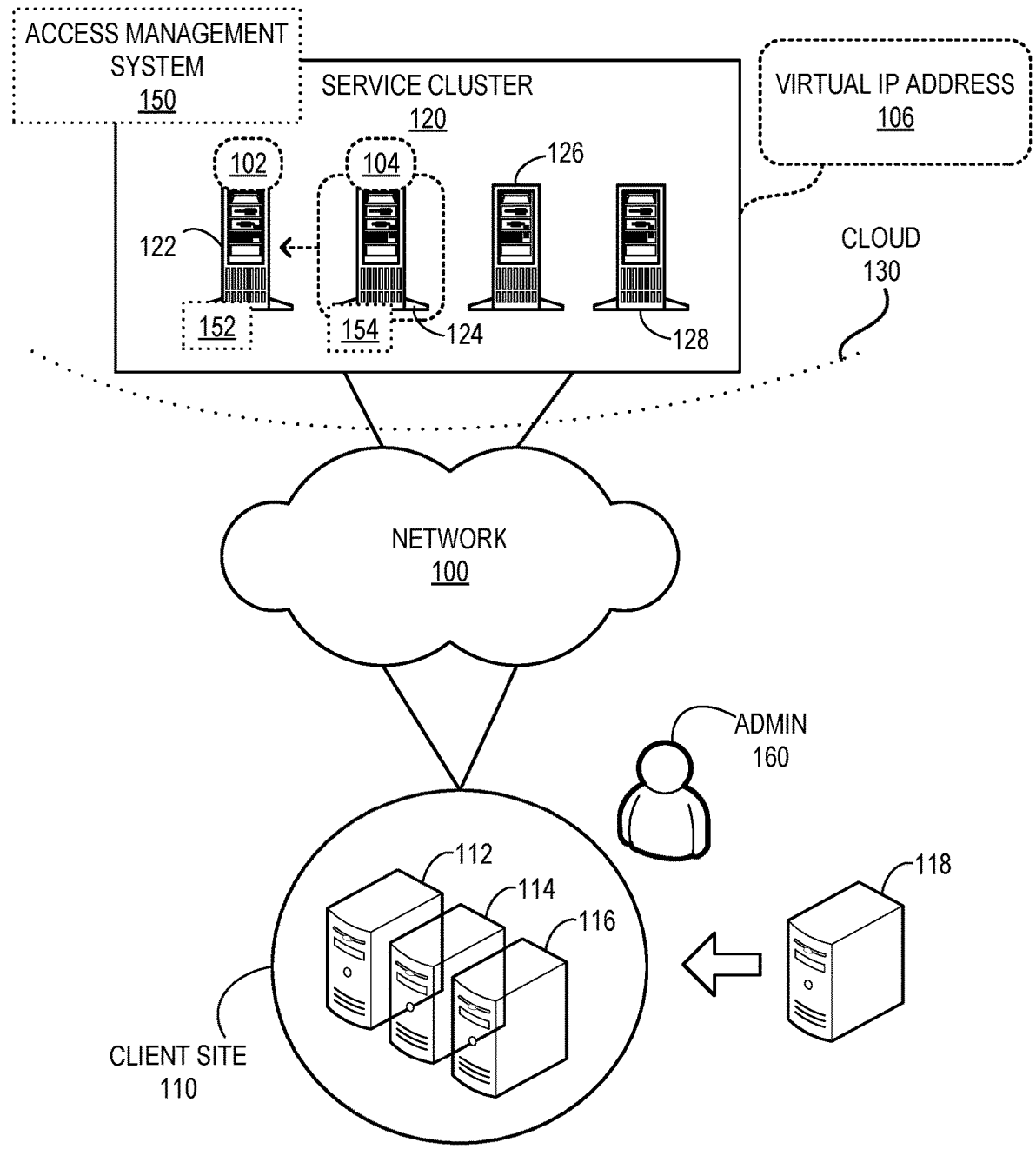
FIG. 1A illustrates an exemplary access management system that facilitates unified and scalable virtual IP address management in a service cluster, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments described herein solve the problem of efficiently accessing a service cluster from a remote client device by (i) allocating a virtual IP address to the service cluster and dynamically selecting a cluster node for hosting the virtual IP address, and (ii) forwarding service requests for the service cluster to the virtual IP address. As a result, a respective service request, regardless of the physical IP addresses of the cluster nodes, can be directed to a cluster node that provides the requested service.

With existing technologies, a respective node in the service cluster may be configured with an IP address. Examples of a node in the service cluster can include, but are not limited to, a server, an appliance, a virtual machine (VM), an application, and a container. If a cluster node provides multiple services, the node can be configured with an IP address for each service it provides. As a result, the service cluster can be associated with a large number of IP addresses. To access a service from the service cluster, a respective client device at the client site may need to be aware of a respective IP address via which it may request a service. If a new client device is added to the client site, an administrator may need to configure the IP addresses on the new client device. In addition, any script or automation technique deployed at the client site needs to be updated each time an IP address is changed in the service cluster or a node is added/deleted. Consequently, access management to the service cluster can become tedious and error-prone.

To solve this problem, the service cluster can be equipped with an access management system that can facilitate efficient access by deploying a scalable virtual IP address in a service cluster. An instance of the system can run on a respective cluster node. Each client may configure a virtual IP address for the service cluster using which the devices of the client site may access the service cluster. If the service cluster is dedicated for the client (e.g., a virtualized slice of the physical service cluster allocated to the client), the system may associate the virtual IP address with the virtual slice for the client. On the other hand, if the physical service cluster is accessed by multiple clients, the service cluster can host a plurality of virtual IP addresses.

The virtual IP address can be a "floating" IP address allocated to a group of nodes in the service cluster. The virtual IP address can float among the nodes to facilitate high availability. The instance of the system in each node of the service cluster can use a selection mechanism to select a hosting node for the virtual IP address based on a set of criteria. The set of criteria can include selecting the hosting node based on one or more of: lowest/highest address value (the IP address and/or a media access control (MAC) address) of a node, provider of most critical service, load on the node, load across the service cluster, and random selection. For example, the system may select a node with the least load among the nodes that host the most-requested service. Such a node can be considered as the "service leader" for the service. The service leader is responsible for responding to a respective request (e.g., a web request, such as Hypertext Transfer Protocol (HTTP) request) for the service.

Upon selecting the hosting node, the system can allocate the virtual IP address to the hosting node. The client device may communicate with the hosting node using the virtual IP address instead of the physical IP address assigned to the node. If the hosting node becomes unavailable, the virtual IP address is hosted by a newly elected hosting node selected based on the set of criteria. Therefore, the virtual IP address can decouple from a specific node and become the address of the service cluster. Since one of the cluster nodes may remain responsible for responding to requests directed to the virtual IP address, a request directed to the virtual IP address can continue to receive a response even if a node fails. This capability of the virtual IP address to be hosted across multiple nodes can facilitate high availability in the service cluster.

Typically, when the client device issues an address resolution protocol (ARP) request (or query) for the virtual IP address, the hosting node can send an ARP response with the physical media access control (MAC) address of the hosting node. The MAC address may belong to the network interface card (NIC) of the hosting node to which the virtual IP address is assigned. The client device can obtain the mapping between the virtual IP address and the MAC address from the ARP resolution and store the mapping in a local ARP cache. The client device may continue to communicate with the virtual IP address using the MAC address based on the mapping in the ARP cache. However, if the virtual IP address is moved to another hosting node (e.g., due to a failure or a configuration change), the MAC address of the new hosting node becomes associated with the virtual IP address. Since this change is not reflected in the ARP cache, the client node may continue to send packets based on the stale MAC address, which can result in a failed service request. This issue can be referred to as the split-brain problem.

To address the split-brain problem, when the virtual IP address is allocated to a new hosting node, the system can send a gratuitous ARP request based on the virtual IP address. Upon receiving the gratuitous ARP request, a respective receiving device can remove the entry comprising the virtual IP address from the local ARP cache. For a subsequent request, the client device can re-issue the ARP request and obtain a response with the MAC address of the new hosting device. Whenever the hosting node changes (e.g., due to unavailability or changes in service leader, service, configuration, or criteria), the system can un-host the virtual IP address from the previous hosting node and host the virtual IP address at the new hosting device. For example, if the hosting node determines that it is no longer is the leader in the service cluster, the instance of the system can trigger the un-hosting process. The service leader is responsible for responding to a respective request for the service If a virtual IP address is associated with a corresponding service, the hosting and un-hosting of the virtual IP address can be associated with the service. The system can then follow the leader selection process for the service to determine whether the leader has changed and trigger hosting/un-hosting based on selection. In other words, the system can maintain the virtual IP address based on the leader for the service. Since each service can be associated with a virtual IP address in the service cluster, a plurality of virtual IP addresses can be allocated to the service cluster. However, such a deployment may require multiple virtual IP addresses for accessing the service cluster. The system may unify the virtual IP addresses using the same virtual IP address for multiple services in the service cluster. The client nodes may send service requests using the virtual IP address. Upon receiving a request, the hosting node may provide the service if the node supports the requested service. Otherwise, the hosting node may forward to another node in the service cluster that can provide the requested service.

The system may trigger the movement of the virtual IP address if the hosting node becomes unavailable. The system can select a new hosting node and host the virtual IP address at the new hosting node. Furthermore, if the service associated with the virtual IP address selects a new service leader or the service becomes unavailable in the service cluster (e.g., the service is partitioned from the service cluster), the system can move the virtual IP address to a new hosting node. In addition, the virtual IP address may also move if the service leader is moved to a new node based on a user configuration or a current condition, such as a device and/or network load. The system can determine the movement based on a notification from the service. Subsequently, the system, in conjunction with the service, can un-host the virtual IP address from the current hosting node and host it at the node facilitating the service leader.

On the other hand, the service leader may also become ungracefully unavailable. In particular, the underlying application providing the service can crash or be terminated by the operating system. However, the node with the new service leader may not be able to host the virtual IP address unless the node with the previous leader un-hosts it. Due to the ungraceful unavailability, the service leader may not be able to un-host. The system can then take over the cleanup operation, which can include the un-hosting operation, upon determining the unavailability. This allows the node facilitating the new service leader to host the virtual IP address. In this way, the system can ensure continuous hosting for the virtual IP address.

Under some scenarios, an instance of the system may become unavailable (e.g., disabled by a user or the operating system) at the current hosting node. A respective node can be equipped with a fail-safe service, which can ensure that, if the system is unavailable in the service cluster without proper cleanup, the node can "un-configure" the virtual IP address from the service cluster. The fail-safe service can monitor the operational status of the system. If the system becomes unavailable before cleaning up the previously hosted virtual IP address, the fail-safe service can perform the cleanup operation as well.

In this way, the system can operate independently of the services provided by the service cluster. Accordingly, when the system manages the virtual IP address on a node (e.g., as the daemon that manages the hosting and un-hosting of the virtual IP address on the node), the services provided by the node are decoupled from the system. Consequently, if a service becomes unavailable on the node but the system remains operational, the system can still un-host the virtual IP address from the node. When the virtual IP address is hosted at a node, the instance of the system on that node can start managing the virtual IP address regardless of the services provided by the node.

In this disclosure, the term "packet" refers to a group of bits that can be transported together across a network. "Packet" should not be interpreted as limiting embodiments of the present invention to any networking layer. "Packet" can be replaced by other terminologies referring to a group of bits, such as "message," "frame," "cell," or "datagram."

The term "switch" is used in a generic sense, and it can refer to any standalone or fabric switch operating in any network layer. "Switch" should not be interpreted as limiting embodiments of the present invention to layer-2 networks. Any physical or virtual device (e.g., a virtual machine, which can be a virtual switch, operating on a computing device) that can forward traffic to an end device can be referred to as a "switch." Examples of such a device include, but not limited to, a layer-2 switch, a layer-3 router, or a routing bridge.

Network Architecture

FIG. 1A illustrates an exemplary access management system that facilitates unified and scalable virtual IP address management in a service cluster, in accordance with an embodiment of the present application. As illustrated in FIG. 1A, a network 100 can include a number of switches. In some embodiments, one or more switches in network 100 can be virtual switches (e.g., a software switch running on a computing device). Network 100 can be an Ethernet and/or IP network, and a respective switch of network 100 can be an Ethernet switch and/or IP router. Hence, the communication among the switches in network 100 can be based on Ethernet and/or IP. Network 100 may be a local area network (LAN) (e.g., a virtual LAN (VLAN)) or a wide area network (e.g., the Internet). Network 100 can be coupled to a client site 110 and a service cluster 120 (e.g., hosted in cloud 130). Network 100 can facilitate communication between client site 110 and service cluster 120.

Client site 110 can include a number of client devices 112, 114, and 116. A respective client device can be any device that can request a service from service cluster 120. Examples of a client device can include, but are not limited to, a desktop or laptop computer, a cellular device, a tablet, a wearable device, a stationary or portable gaming console, a projection device, an attachable dongle, an augmented or virtual reality device, and a vehicular device. Furthermore, service cluster 120 (e.g., hosted in cloud 130), which can include a number of nodes 122, 124, 126, and 128. Examples of a node in service cluster 120 can include, but are not limited to, a server, an appliance, a VM, an application, and a container.

With existing technologies, a respective node in service cluster 120 may be configured with an IP address. If a node, such as node 122, in service cluster 120 provides multiple services, node 122 can be configured with an IP address for each service it provides. As a result, service cluster 120 can be configured with a large number of IP addresses. To access a service from service cluster 120, a respective client device at client site 110 may need to be aware of a respective IP address of service cluster 120. If a new client device 118 is added to client site 110, an administrator 160 may need to configure the IP addresses on client device 118. In addition, any script or automation technique deployed at client site 110 needs to be updated each time an IP address is changed in service cluster 120 or a node is added to/deleted from service cluster 120. For example, administrator 160 can deploy a script that can access a service from service cluster 120 and run on the devices at client site 110. Any IP address related changes in service cluster 120 can then trigger a change in the script in each of devices 112, 114, 116, and 118, which can be tedious and error-prone.

To solve this problem, an access management system 150 can be deployed in service cluster 120. System 150 can facilitate efficient access to service cluster 120 by allocating a scalable virtual IP address 106 in service cluster 120. An instance of system 150 can run on a respective node of service cluster 120. For example, system instances 152 and 154 can run on nodes 122 and 124, respectively. Each client that may receive services from service cluster 120 may configure a virtual IP address for service cluster 120. For example, system 150 can allow administrator 160 to configure virtual IP address 106 for client site 110. Virtual IP address 106 may belong to the same subnet from which the IP addresses are allocated to client devices of client site 110. Consequently, virtual IP address 106 and the IP address of client device 112 can belong to the same subnet. As a result, when client device 112 requests a service using virtual IP address 106, client device 112 can determine that the service is requested from the local network.

If service cluster 120 is dedicated for client site 110, which can be a virtualized slice of an underlying physical service cluster, system 150 may associate virtual IP address 106 with the virtual slice for client site 110. On the other hand, if service cluster 120 is a physical cluster accessed by multiple clients, service cluster 120 can host a plurality of virtual IP addresses, each corresponding to a different client site. Virtual IP address 106 can be a "floating" IP address allocated to nodes 122, 124, 126, and 128. The virtual IP address can float among these nodes. The instance of system 150 in each node of service cluster 120 can use a distributed selection mechanism to select a hosting node for virtual IP address 106 based on a set of criteria. The set of criteria can include selecting the hosting node based on one or more of: lowest/highest address value of a node, provider of most critical service, load on the node, load across service cluster 120, and random selection. Each instance of system 150 can independently select node 124 as the hosting node (denoted with dotted lines). Therefore, even though instances 152 and 154 of system 150 can independently execute the selection mechanism, both instances 152 and 154 can select node 124 as the hosting node.

System 150 may select node 124 as the hosting node because node 124 has the least load among the nodes that host the most-requested service from service cluster 120. Hence, node 124 can be considered as a service leader for the service. The service leader is responsible for responding to a respective request for the service. Based on the selection, instance 154 can allocate virtual IP address 106 to node 124. Client device 112 may communicate with node 124 using virtual IP address 106 instead of the physical IP address assigned to node 124. If node 124 becomes unavailable, system 150 can select a new hosting node for virtual IP address 106. Therefore, virtual IP address 106 can decouple from a specific node and become the IP address of service cluster 120. Since one of the nodes in service cluster 120 may remain responsible for responding to requests directed to virtual IP address 106, a request directed to virtual IP address 106 can continue to receive a response even if a node fails. This capability of virtual IP address 106 to be hosted across multiple nodes can facilitate high availability in service cluster 120.

Typically, when client device 112 issues an ARP request for virtual IP address 106, node 124 can send an ARP response with physical MAC address 104 of node 124. MAC address 104 may belong to node 124's NIC configured with virtual IP address 106. Client device 112 can obtain the mapping between virtual IP address 106 and MAC address 104 from the ARP response, and store the mapping in a local ARP cache of client device 112. Client device 112 may continue to communicate with virtual IP address 106 using MAC address 104 based on the mapping in the ARP cache. However, if virtual IP address 106 is moved to another node 122 (e.g., due to unavailability or changes in leader node, service, configuration, or criteria), a MAC address 102 of the new hosting node 122 becomes associated with virtual IP address 106. Since this change is not reflected in the ARP cache, client node 112 may continue to send packets based on MAC address 104, which can result in a failed service request. This issue can be referred to as the split-brain problem.

To address the split-brain problem, when virtual IP address 106 is allocated to node 122, instance 152 can send a gratuitous ARP request based on virtual IP address 106. Upon receiving the gratuitous ARP request, client device 112 can remove the entry comprising virtual IP address 106 from the local ARP cache. For a subsequent request, client device 112 can re-issue the ARP request and obtain a response with MAC address 102. In this way, when the hosting of virtual IP address 106 changes, system 150 can un-host virtual IP address 106 from node 124 and host virtual IP address 106 at new hosting device 122.

Here, instance 154 can determine that node 124 can no longer be the hosting node and un-host virtual IP address 106 from node 124. Upon un-hosting, each instance, such as instances 152 and 154, can independently determine that a new hosting node is needed for virtual IP address 106 and select node 122 as the new hosting node. Instance 154 can then start hosting virtual IP address 106 at node 122 (denoted with a dotted arrow). For example, if instance 154 determines that node 124 is no longer is the service leader in cluster 120, instance 154 can trigger the un-hosting process. Similarly, if node 122 is elected as the new service leader, instance 152 can trigger the hosting process.

Figure 1B:
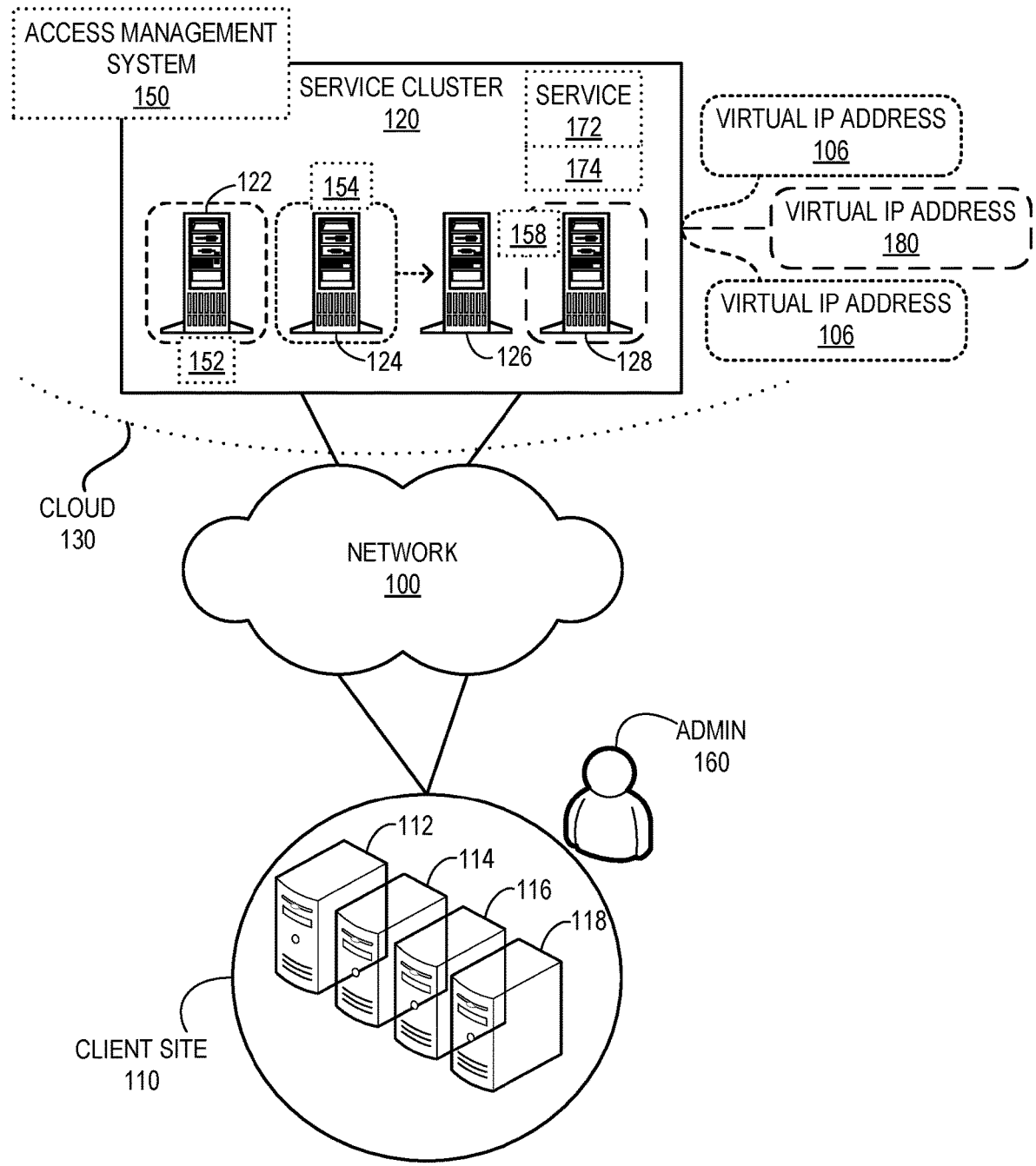
FIG. 1B illustrates an exemplary access management system that facilitates service-based scalable virtual IP address management in a service cluster, in accordance with an embodiment of the present application.

FIG. 1B illustrates an exemplary access management system that facilitates service-based scalable virtual IP address management in a service cluster, in accordance with an embodiment of the present application. Service cluster 120 can provide a number of services, such as service 172 and 174. If virtual IP address 106 is associated with service 172, the hosting and un-hosting of virtual IP address 106 can be associated with service 172. Similarly, if another virtual IP address 108 is associated with service 174, the hosting and un-hosting of virtual IP address 108 can be associated with service 174.

System 150 can then follow the leader selection process for service 172 to determine whether the leader has changed and trigger hosting/un-hosting based on selection. In other words, system 150 can maintain virtual IP address 106 based on the leader for service 172. Suppose that nodes 124 and 122 are selected as leaders for services 172 and 174, respectively. System 150 can then host virtual IP addresses 106 and 108 at nodes 124 and 122, respectively.

System 150 may trigger the movement of virtual IP address 106 if node 124 becomes unavailable. System 150 can select a new hosting node 126 and host virtual IP address 106 at node 126. Furthermore, if a new service leader is selected for service 172 or service 172 becomes unavailable in cluster 120 (e.g., service 172 is partitioned from cluster 120), system 150 can move virtual IP address 106 to a new service leader, which can be on node 126. In addition, virtual IP address 106 may also move if the service leader is moved to node 126 based on a user configuration or a current condition, such as a device and/or network load. System 150 can determine the movement based on a notification from service 172. Subsequently, system 150, in conjunction with service 172, can un-host virtual IP address 106 from node 124 and host it at node 126.

On the other hand, the service leader for service 172 may also become ungracefully unavailable on node 124. In particular, the underlying application providing service 172 can crash or be terminated by the operating system of node 124. However, node 126 may not be able to host virtual IP address 106 unless it is un-hosted on node 124. Due to the ungraceful unavailability, service 172 on node 124 may not be able to un-host. System 150 (e.g., system instance 154) can then take over the cleanup operation, which can include the un-hosting operation for virtual IP address 106, upon determining the unavailability. This allows node 126 to host virtual IP address 106. In this way, system 150 can ensure continuous hosting for virtual IP address 106.

Since services 172 and 174 can be associated with virtual IP addresses 106 and 108, in service cluster 120, a respective client device, such as client device 112, in client site 110 may need to be aware of virtual IP addresses 106 and 108. If a new service is deployed in service cluster 120, administrator 160 may need to configure the corresponding virtual IP address in client device 112. Furthermore, any script or automation technique deployed at client site 110 needs to be updated with the new virtual IP address. To further enhance the performance of system 150, a unifying virtual IP address 180 can be supported by system 150.

Service cluster 120 can use the same virtual IP address 180 for multiple services. System 120 can select a hosting node 126 for virtual IP address 180. Node 126 can be in the service path for a service request and/or operate as a redirector. Client node 112 may send a service request using virtual IP address 180 for service 172. If node 126 is placed in the service path, upon receiving the request, node 126 may provide service 172 if node 126 supports service 172. If node 126 does not support service 172 and/or operate as a redirector, node 126 may forward the request to another node in cluster 120 that can provide service 172.

In this way, system 150 can operate independently of the services provided by service cluster 120. Accordingly, when system 150 manages virtual IP address 180 on node 128 (e.g., as the daemon that manages the hosting and un-hosting of virtual IP address 180 on node 128), the services provided by node 128 are decoupled from system 150. Consequently, if a service becomes unavailable on node 128 but an instance 158 of system 150 on node 128 remains operational, system instance 158 can still un-host virtual IP address 180 from node 128. Therefore, when virtual IP address 180 is hosted at node 128, system instance 158 on node 128 can start managing virtual IP address 180 regardless of the services provided by the node.

Under some scenarios, system instance 154 may become unavailable (e.g., disabled by a user or the operating system) at node 124. A respective node in service cluster 120 can be equipped with a fail-safe service, which can ensure that, if system instance 154 is unavailable without proper cleanup, node 124 can "un-configure" virtual IP address 106 from cluster 120. The fail-safe service can monitor the operational status of a respective instance of system 150. If instance 154 becomes unavailable before cleaning-up virtual IP address 106, the fail-safe service can perform the cleanup operation on node 124 as well.

Access Management Using a Virtual IP Address

Figure 2A:
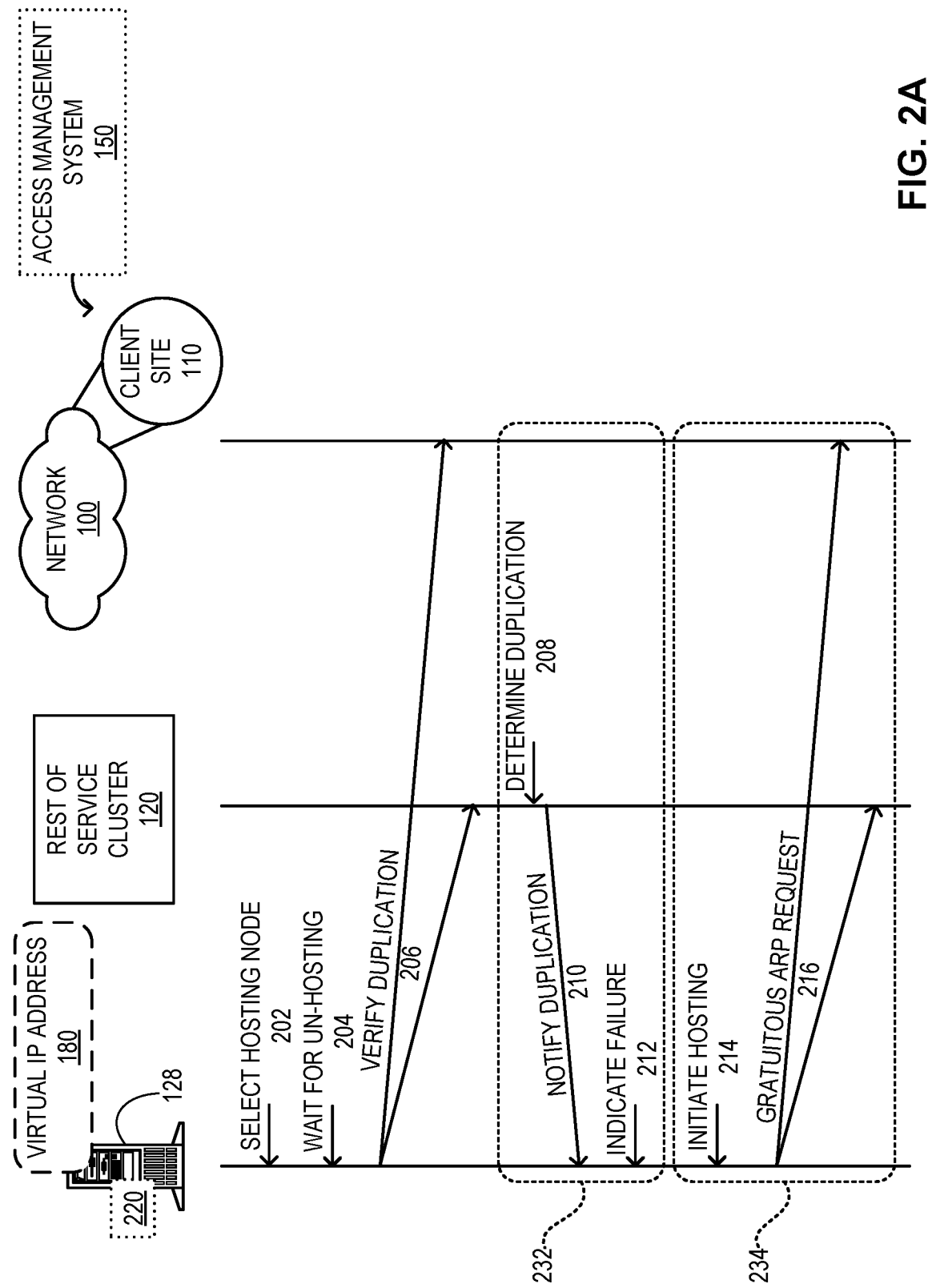
FIG. 2A illustrates exemplary communications for virtual IP address allocation in a service cluster, in accordance with an embodiment of the present application.

In the example in FIG. 1B, when virtual IP address 180 is allocated to node 128, system 150 needs to verify that virtual IP address 180 has been un-hosted at the previous hosting node, if any, and is not duplicated in service cluster 120, network 100, and client site 110. This ensures the unique deployment of virtual IP address 180 in service cluster 120. FIG. 2A illustrates exemplary communications for virtual IP address allocation in a service cluster, in accordance with an embodiment of the present application. During operation, an instance 220 of system 150 can select node 128 as the hosting node for virtual IP address 180 (operation 202). The election process can be independently executed on a respective node in service cluster 120. System instance 220 can then wait for a predetermined period for un-hosting at a previous hosting node, if any (operation 204). The un-hosting is needed if the selection is in response to a movement of virtual IP address 180.

System instance 220 can then verify duplication for virtual IP address 180 with the rest of the service cluster 120, network 100, and client site 110 (operation 206). In some embodiments, system instance 220 can detect duplication using an ARP command by executing the ARP service in a duplicate address detection (DAD) mode. System instance 220 can send an ARP command for virtual IP address 180 to the rest of the service cluster 120, network 100, and client site 110. If multiple service clusters are deployed for client site 110, system instance 220 may also send the ARP command to the other service clusters. System instance 220 can then determine whether any device sends a response indicating the duplication of virtual IP address 180.

If duplication is detected, a failure scenario 232 occurs for the hosting of virtual IP address 180. Otherwise, a successful hosting scenario 234 occurs. For scenario 232, suppose that a node in the rest of service cluster 120 determines duplication (operation 208). The node can then notify node 128 regarding the duplication (e.g., using an ARP response message) (operation 210). System instance 220 can then indicate a failure for the hosting of virtual IP address 180 (operation 212). On the other hand, for scenario 234, system instance 220 can initiate the hosting of virtual IP address 180 (operation 214) and send a gratuitous ARP request to the rest of the service cluster 120, network 100, and client site 110 (operation 216). The gratuitous ARP request can clear an entry associated with virtual IP address 180 in an ARP cache.

Figure 2B:
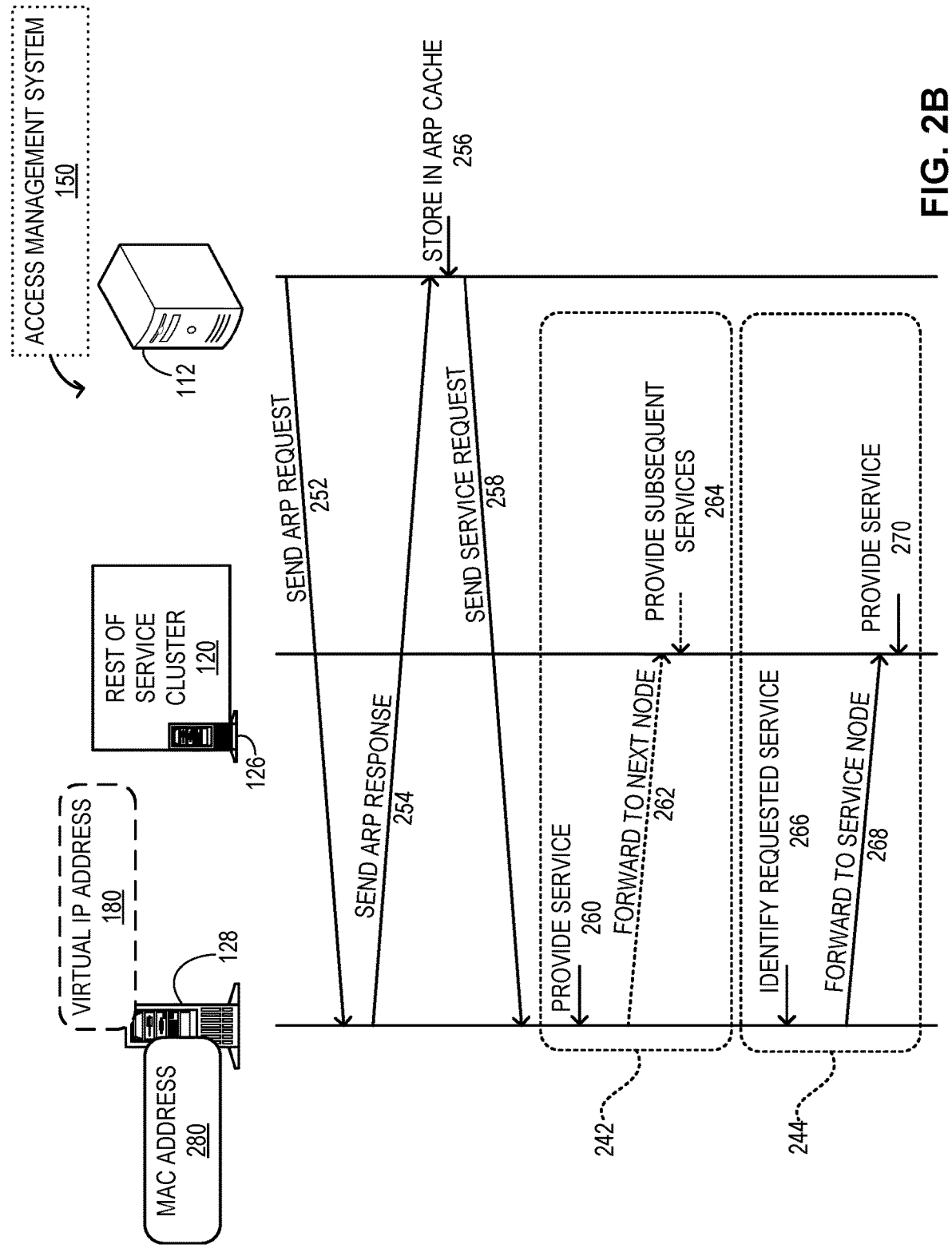
FIG. 2B illustrates exemplary communications for facilitating service from a service cluster based on a virtual IP address, in accordance with an embodiment of the present application.

Upon hosting virtual IP address 180, node 128 can start receiving service requests with a destination address comprising virtual IP address 180. FIG. 2B illustrates exemplary communications for facilitating service from a service cluster based on a virtual IP address, in accordance with an embodiment of the present application. During operation, client node 112 can send an ARP request for virtual IP address 180 (operation 252). Upon receiving the ARP request, node 128 can send an ARP response comprising a mapping between virtual IP address 180 and a MAC address 280 of node 128 (operation 254). MAC address 280 can be a physical MAC address of the NIC configured with virtual IP address 180. MAC address 280 can also be a virtual MAC address allocated to the hosting node in service cluster 120. Since a virtual MAC address can move among nodes, such a movement can trigger reconfiguration of the network (e.g., an Ethernet network) within service cluster 120, similar to a VM migration.

Subsequently, client device 112 can store the mapping in a local ARP cache of client device 112 (operation 256), and send a service request to node 128 based on virtual IP address 180 and MAC address 280 (operation 258). Based on the request, node 128 can either be on the service path where node 128 can may provide the requested service (scenario 242) or a redirector where node 128 can forward the request to a node that can provide the requested service (scenario 244). For scenario 242, upon receiving the service request, node 128 can provide the service, if supported (operation 260). Node 128 can then, optionally, forward the service request to the next node in the rest of service cluster 120 that can provide a subsequent service requested by the service request (operation 262). Subsequently, the rest of service cluster 120 can provide the subsequent services (operation 264). In FIG. 2B, optional operations are denoted with dotted arrows.

On the other hand, for scenario 244, node 128 may not facilitate the requested service and operate as a redirector in service cluster 120. Node 128 (and other nodes in service cluster 120) may maintain a list of services provided by service cluster 120 and the nodes that can provide a respective service. Based on the list, node 128 can identify the requested service (operation 266) and forward the service request to a corresponding service node, such as node 126, that can provide the requested service (operation 268). Upon receiving the service request, node 126 can then provide the requested service (operation 270). In this way, service cluster 120 can be reached using a unifying virtual IP address 180 for a respective service provided by service cluster 120.

Operations

Figure 3A:
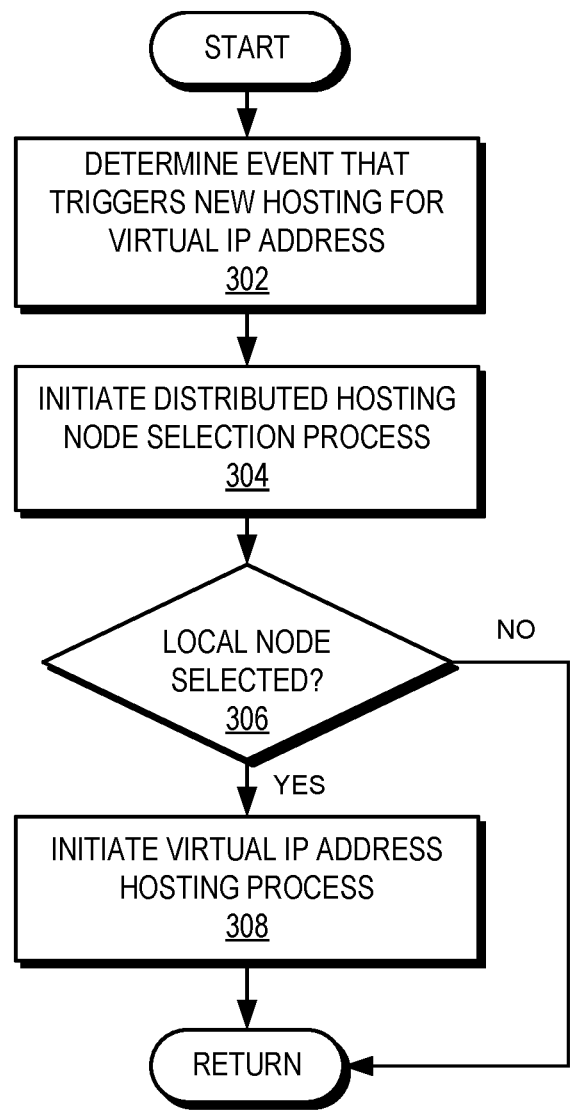
FIG. 3A presents a flowchart illustrating the process of an access management system instance on a service node initiating a distributed virtual IP address hosting operation, in accordance with an embodiment of the present application.

FIG. 3A presents a flowchart illustrating the process of an access management system instance on a service node initiating a distributed virtual IP address hosting operation, in accordance with an embodiment of the present application. During operation, the system instance can determine an event that triggers a new hosting for the virtual IP address (operation 302). Examples of the event include, but are not limited to, the unavailability of a node, the unavailability of a service, a new service leader selection for a service, a control plane being unreachable, and the unavailability of the system (e.g., due to a crash or an action from the operating system).

The system instance can then initiate a distributed hosting node selection process (operation 304). The selection process can determine whether the local node is elected as the hosting node based on a set of selection criteria. If the virtual IP address is associated with a service, the selection criteria can include whether the local node supports the service leader. The system instance can determine whether the local node is selected as the hosting node (operation 306). If the local node is selected, the system instance can initiate a virtual IP address hosting process (operation 308).

Figure 3B:
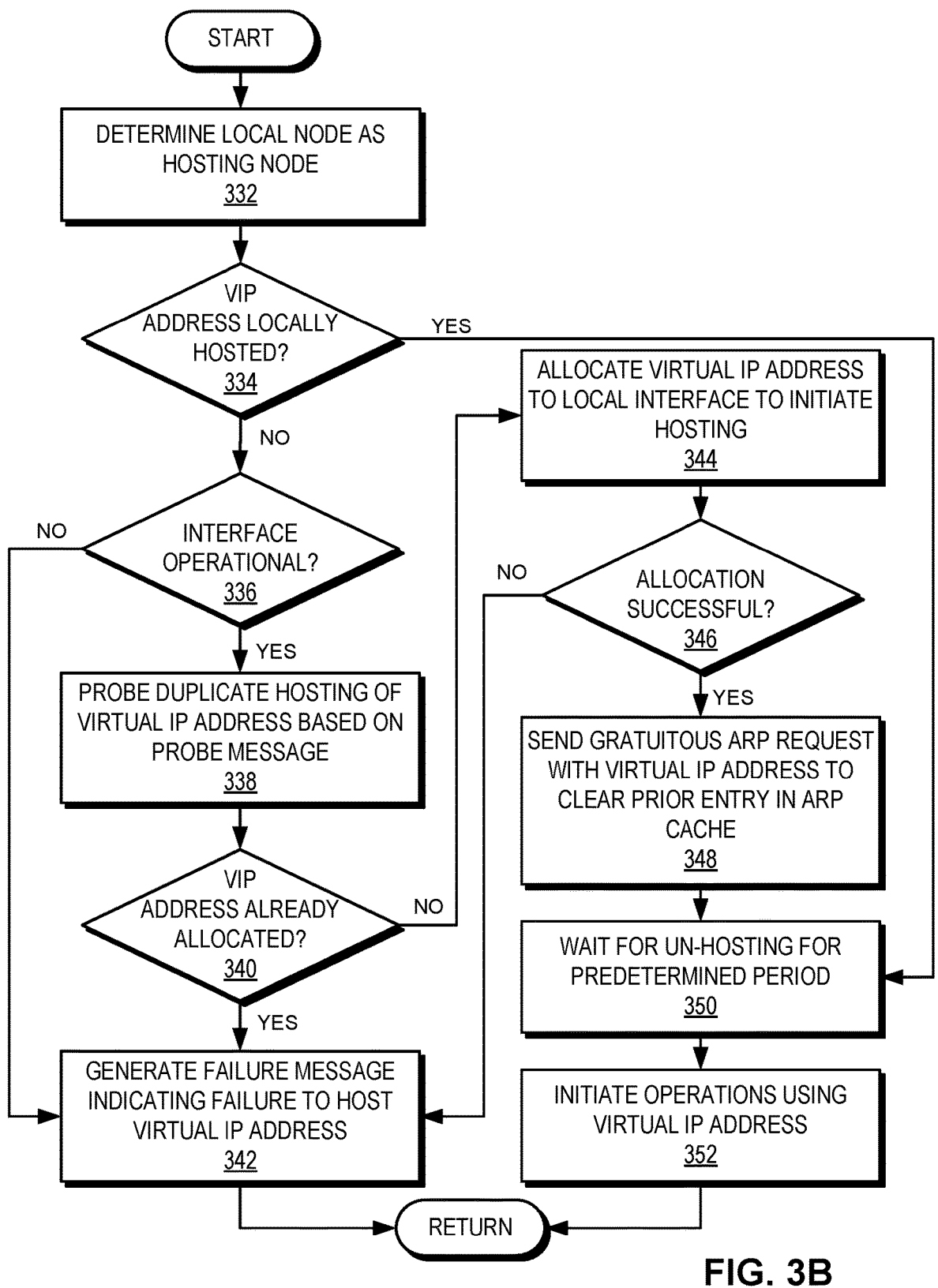
FIG. 3B presents a flowchart illustrating the process of an access management system instance on a service node hosting a virtual IP address, in accordance with an embodiment of the present application.

FIG. 3B presents a flowchart illustrating the process of an access management system instance on a service node hosting a virtual IP address, in accordance with an embodiment of the present application. During operation, the system instance determines the local node as the hosting node (operation 332) and determines whether the virtual IP address is locally hosted (operation 334). If the virtual IP address is not locally hosted, the system can determine whether the interface to which the virtual IP address is going to be allocated is operational (operation 336). In some embodiments, the system instance may use an ipconfig or ifconfig command to determine the operational status of the interface.

If the interface is operational, the system instance may probe duplicate hosting of the virtual IP address based on a probe message (e.g., an ARP request in a DAD mode) (operation 338). Based on the probing, the system instance can determine whether the virtual IP address is already allocated to another node in the service cluster, other service clusters, if any, a switch in a network coupled to the service cluster(s), or a client device in the client site (operation 340). If the virtual IP address is not already allocated, the system instance can allocate the virtual IP address to the local interface to initiate the hosting (operation 344). In some embodiments, the system instance may use an ipconfig or ifconfig command for the allocation. The system can then determine whether the allocation is successful (operation 346).

If the allocation is successful, the system instance can send a gratuitous ARP request with the virtual IP address to clear any existing entry for the virtual IP address in an ARP cache (operation 348). If the virtual IP address is locally hosted, another entity, such as a service instance on the node, may have hosted the virtual IP address at the node. Hence, if the virtual IP address is locally hosted (operation 334) or upon sending the gratuitous ARP request (operation 348), the system instance can wait for the un-hosting of the virtual IP address for a predefined period (operation 350). The waiting period allows a previous hosting node, if any, to un-host the virtual IP address before the operations using the virtual IP address begins. The system instance can then initiate operations using the virtual IP address (operation 352).

Figure 3C:
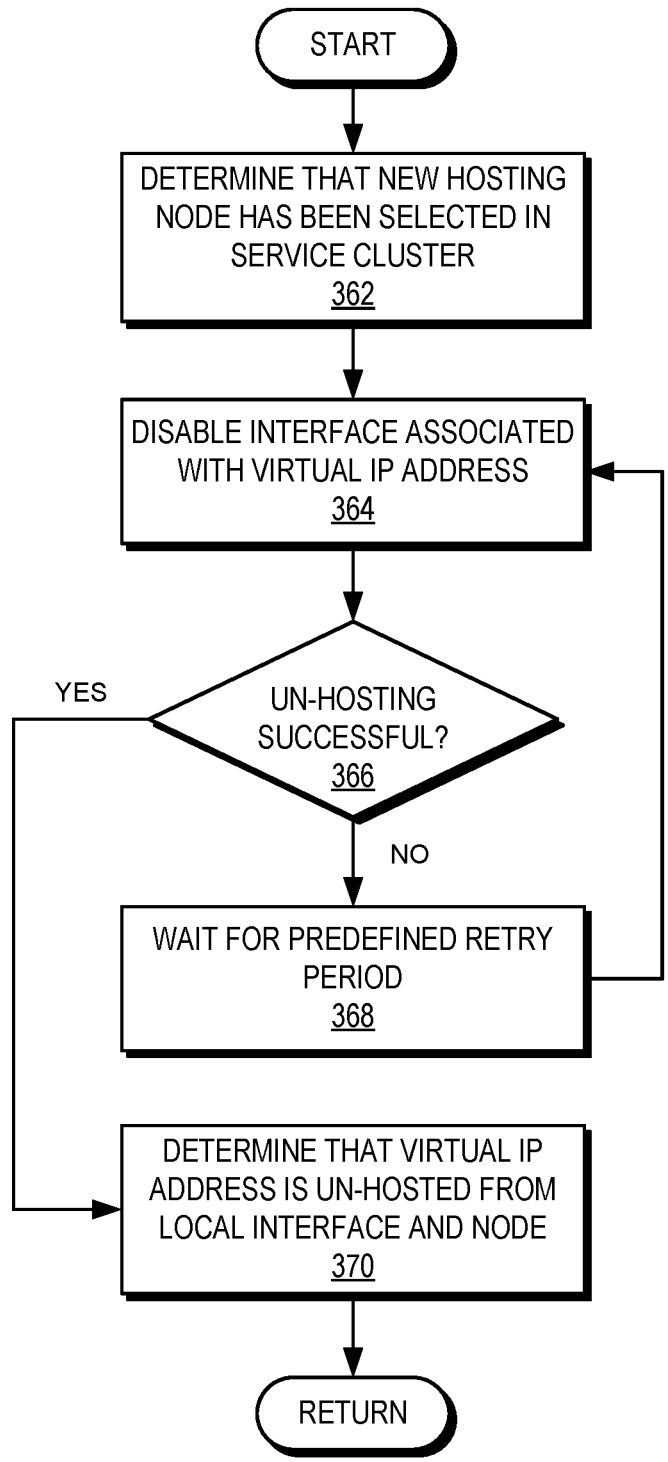
FIG. 3C presents a flowchart illustrating the process of an access management system instance on a service node un-hosting a virtual IP address, in accordance with an embodiment of the present application.

FIG. 3C presents a flowchart illustrating the process of an access management system instance on a service node un-hosting a virtual IP address, in accordance with an embodiment of the present application. During operation, the system instance can determine that a new hosting node has been selected in the service cluster (e.g., a new service leader has been selected) (operation 362). The system instance can then disable the interface associated with the virtual IP address (operation 364) and determines whether the un-hosting is successful (operation 366). If the un-hosting is unsuccessful, the interface can be occupied with an operation (e.g., transmitting or receiving traffic). The system instance can then wait for a predefined retry period (operation 368) and try to disable the interface associated with the virtual IP address again (operation 364). On the other hand, if the un-hosting is successful, the system instance can determine that a virtual IP address is un-hosted from the local interface and node (operation 370).

Figure 3D:
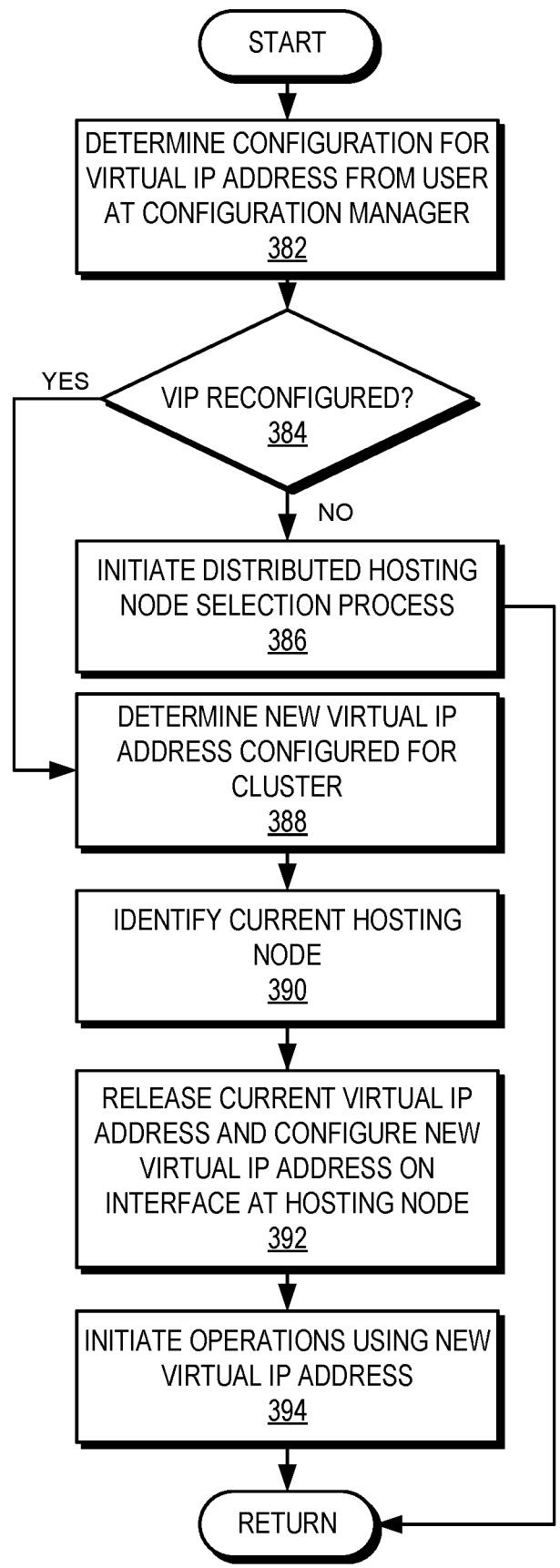
FIG. 3D presents a flowchart illustrating the process of an access management system instance on a service node managing the configuration for a virtual IP address, in accordance with an embodiment of the present application.

FIG. 3D presents a flowchart illustrating the process of an access management system instance on a service node managing the configuration for a virtual IP address, in accordance with an embodiment of the present application. During operation, the system instance can determine a configuration for the virtual IP address from a user (e.g., an administrator) at a configuration manager (operation 382). The configuration manager can be used to provision and manage the service cluster. Examples of a configuration manager can include, but are not limited to, Azure Cluster Management (ACM), Amazon Redshift Manager, and Nutanix Prism. The configuration can be for a new virtual IP address or updating/replacing an existing virtual IP address.

The system instance can determine whether the virtual IP address is reconfigured (operation 384). If the virtual IP address is reconfigured, the system instance can determine the new virtual IP address configured for the cluster (operation 388) and identify the current hosting node (operation 390). The system instance can then release the current virtual IP address and configure the new IP address on the interface at the hosting node (operation 392). The system instance can then initiate operations using the new virtual IP address (operation 394). On the other hand, if the virtual IP address is not reconfigured, the system instance can initiate a distributed hosting node selection process (operation 386).

Figure 4A:
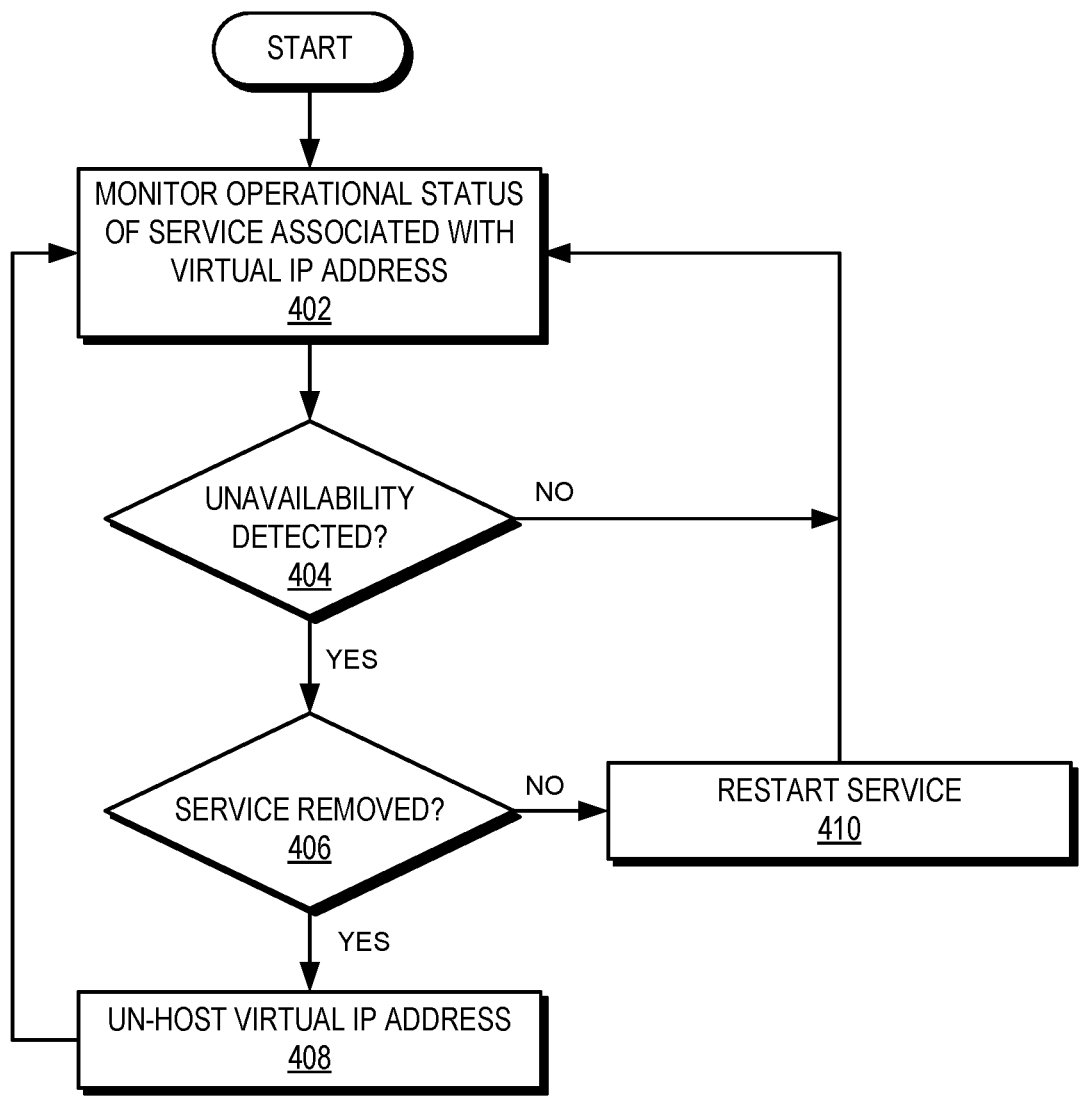
FIG. 4A presents a flowchart illustrating the process of an access management system instance on a service node facilitating a monitoring service for determining the operational status of a service, in accordance with an embodiment of the present application.

FIG. 4A presents a flowchart illustrating the process of an access management system instance on a service node facilitating a monitoring service for determining the operational status of a service, in accordance with an embodiment of the present application. This monitoring operation can ensure that, even if a node is operational but a service on the node is unavailable, the virtual IP address is moved. During operation, the system instance can monitor the operational status of the service associated with the virtual IP address (operation 402) and determine whether an unavailability is detected (operation 404). If the unavailability is detected, the system instance can determine whether the service is removed (operation 406).

If the service is not removed, the node may still maintain the service instance. The system instance can restart the service (operation 410). If the unavailability is not detected (operation 404) or the service has been restarted (operation 410), the system instance can continue to monitor the operational status of the service associated with the virtual IP address (operation 402). On the other hand, the system instance can un-host the virtual IP address (operation 408) and continue to monitor the operational status of the service associated with the virtual IP address (operation 402). This allows the system to host the virtual IP address at a new node.

Figure 4B:
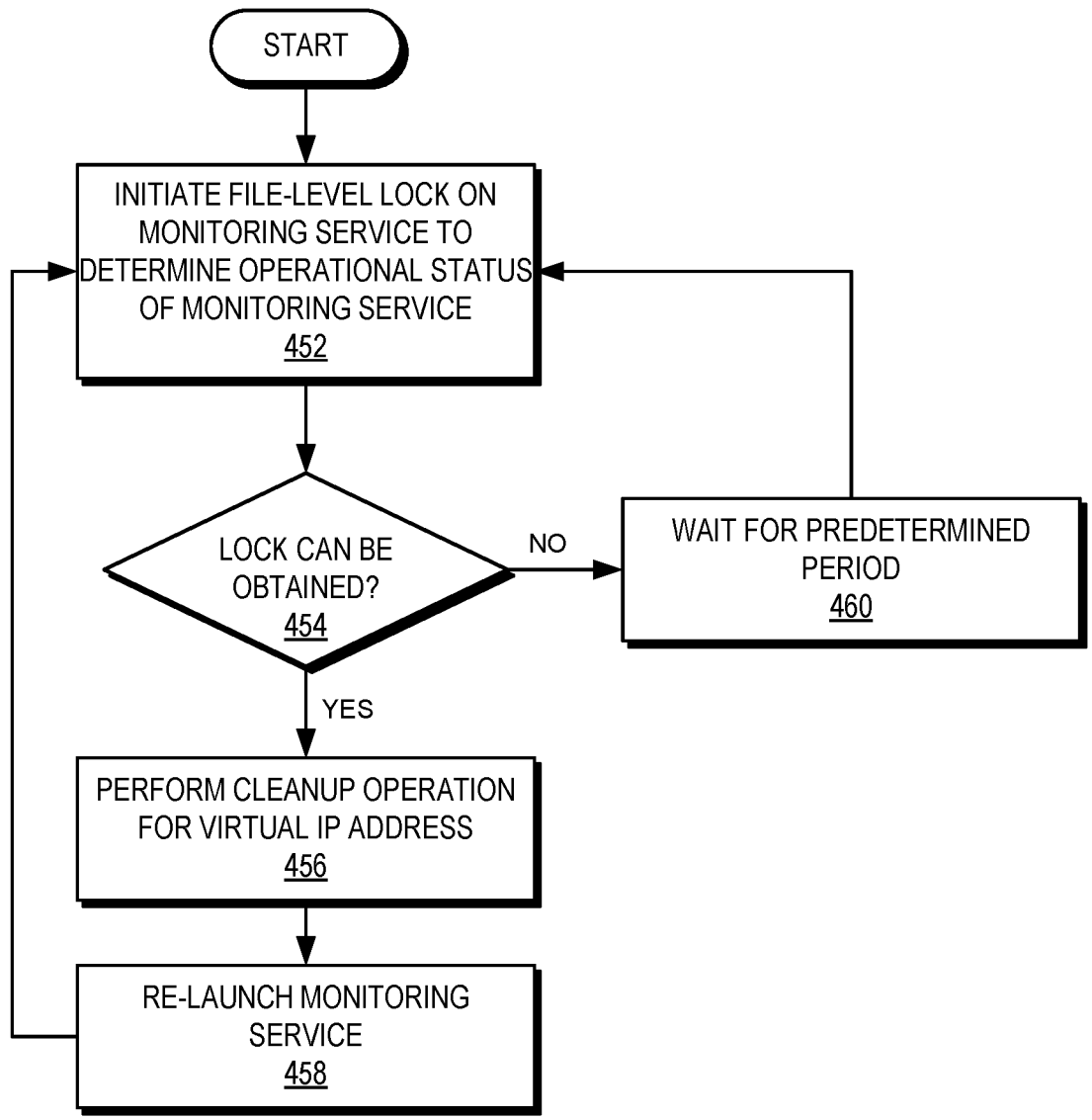
FIG. 4B presents a flowchart illustrating the fail-safe process of a service node monitoring the operational status of a monitoring service, in accordance with an embodiment of the present application.

FIG. 4B presents a flowchart illustrating the fail-safe process of a service node monitoring the operational status of a monitoring service, in accordance with an embodiment of the present application. During operation, the fail-safe process can initiate a file-level lock on a monitoring service of an access management system to determine the operational status of the monitoring service (operation 452). If the lock cannot be obtained, the fail-safe process can determine that the monitoring service is operational and wait for a predetermined period (operation 460). On the other hand, if the lock can be obtained, the fail-safe process can perform the cleanup operation for the virtual IP address (operation 456) and re-launch the monitoring service (operation 458). If the lock cannot be obtained (operation 454) or the monitoring service is re-launched (operation 458), the fail-safe process can continue to periodically initiate a file-level lock on the monitoring service (operation 452).

Exemplary Computer System and Apparatus

Figure 5:
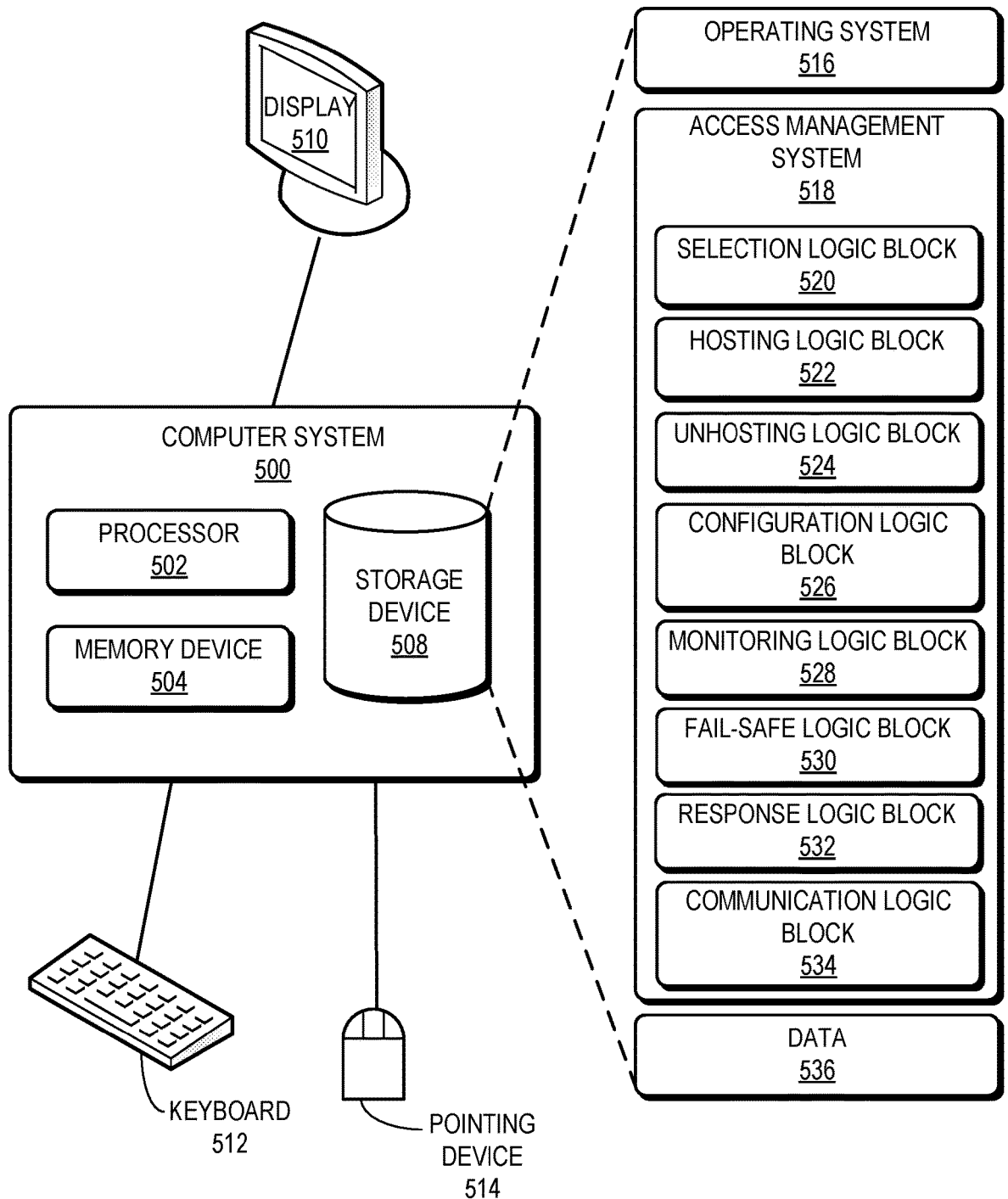
FIG. 5 illustrates an exemplary computer system that facilitates an access management system providing virtual IP address management in a service cluster, in accordance with an embodiment of the present application.

FIG. 5 illustrates an exemplary computer system that facilitates an access management system providing virtual IP address management in a service cluster, in accordance with an embodiment of the present application. Computer system 500 includes a processor 502, a memory 504, and a storage device 508. Memory 504 can include volatile memory (e.g., a dual in-line memory module (DIMM)). Furthermore, computer system 500 can be coupled to a display device 510, a keyboard 512, and a pointing device 514. Storage device 508 can store an operating system 516, an access management system 518, and data 536. Access management system 518 can facilitate the operations of system 150. It should be noted that, depending on the operations executed on a specific device, an instance of access management system 518 may include a subset of the logic blocks on that device.

Access management system 518 can include instructions, which when executed by computer system 500, can cause computer system 500 to perform methods and/or processes described in this disclosure. Specifically, access management system 518 can include instructions for dynamically selecting a hosting node and a service leader for a service in a service cluster (selection logic block 520). Furthermore, access management system 518 can include instructions for hosting a virtual IP address at the hosting node (hosting logic block 522). Access management system 518 can also include instructions for un-hosting the virtual IP address from the hosting node if the node and/or the service become unavailable (un-hosting logic block 524).

In addition, access management system 518 can also include instructions for operating in conjunction with a configuration manager of the service cluster (configuration logic block 526). Furthermore, access management system 518 can include instructions for obtaining a new configuration (e.g., a new virtual IP address or an update to an existing virtual IP address) and deploy the new configuration in computer system 500 and/or the service cluster (configuration logic block 526).

Moreover, access management system 518 includes instructions for providing a monitoring service for a respective service in the service cluster and performing cleanup operations if a service becomes unavailable (monitoring logic block 528). In some embodiments, access management system 518 can operate with a fail-safe process of computer system 500 (e.g., provided by operating system 516 or an application running on operating system 516). Access management system 518 can include instructions for operating with a fail-safe process for the monitoring service and performing cleanup operations if the monitoring service becomes unavailable (fail-safe logic block 530).

Access management system 518 can further include instructions for providing a response to a service request received based on the virtual IP address by placing computer system 500 on the service path or operating computer system 500 as a redirector (response logic block 532). Access management system 518 can also include instructions for sending and receiving name queries and/or query responses, and other layer-2 and/or layer-3 packets (communication logic block 534). Data 536 can include any data that is required as input or that is generated as output by the methods and/or processes described in this disclosure. Specifically, data 536 can include a list of services provided by the service cluster, the service leader of each service, the hosting node selection criteria, and configuration information for one or more virtual IP addresses.

Figure 6:
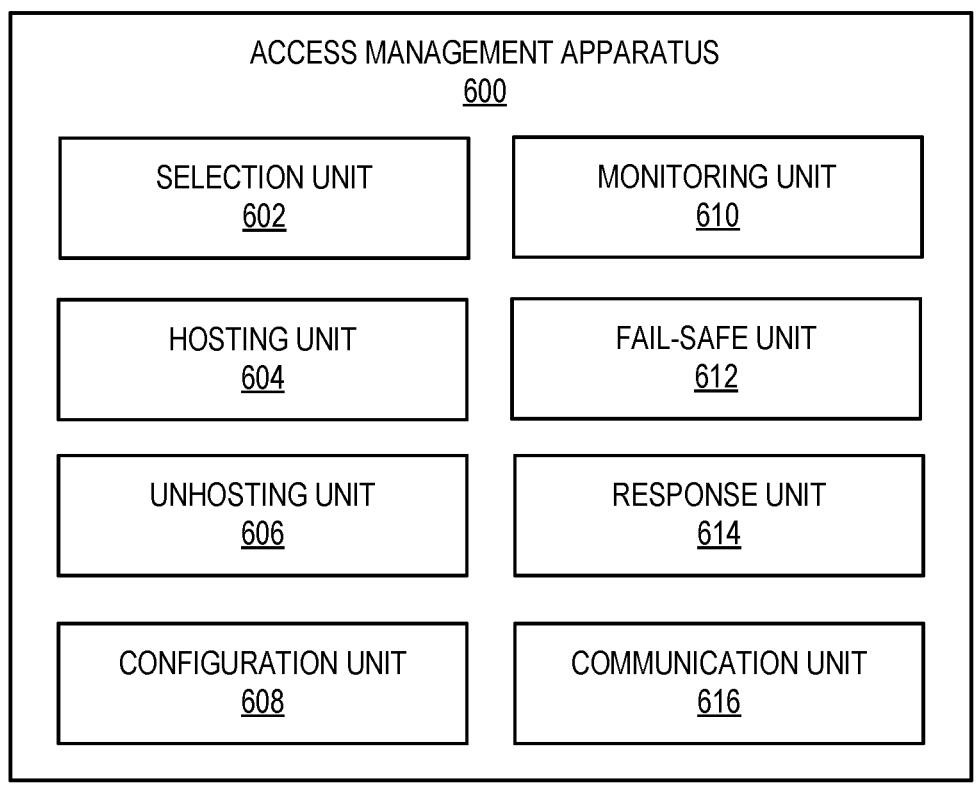
FIG. 6 illustrates an exemplary apparatus that facilitates an access management system providing virtual IP address management in a service cluster, in accordance with an embodiment of the present application.

FIG. 6 illustrates an exemplary apparatus that facilitates an access management system providing virtual IP address management in a service cluster, in accordance with an embodiment of the present application. Access management apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Apparatus 600 may also be a network device (e.g., a switch, a router, etc.).

Specifically, apparatus 600 can comprise units 602-616, which perform functions or operations similar to logic blocks 520-534 of computer system 500 of FIG. 5, including: a selection unit 602; a hosting unit 604; an un-hosting unit 606; a configuration unit 608; a monitoring unit 610; a fail-safe unit 612, a response unit 614; and a communication unit 616.

Note that the above-mentioned logic blocks and modules can be implemented in hardware as well as in software. In one embodiment, these logic blocks and modules can be embodied in computer-executable instructions stored in a memory which is coupled to one or more processors in computer system 500 and/or apparatus 600. When executed, these instructions cause the processor(s) to perform the aforementioned functions.

In summary, embodiments of the present invention provide a system and a method for managing access to a service from a cluster of computing nodes. An instance of the system can operate on a respective computing node. During operation, the system instance can identify an Internet Protocol (IP) address, which provides access to the service from the cluster of computing nodes to a client device at a client site. The system instance can select the computing node for hosting the IP address in the cluster of computing nodes based on a set of selection criteria. The selection is performed independently at the computing node. The system instance can then assign the IP address to the computing node. The assignment allows a request for the service to be directed to the computing node. Subsequently, the system instance can facilitate the service from the cluster of computing nodes based on the request.

The methods and processes described herein can be embodied as code and/or data, which can be stored in a non-transitory computer-readable storage medium. When a computer system reads and executes the code and/or data stored on the non-transitory computer-readable storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for managing services provided by a plurality of computing nodes, comprising:
    identifying an Internet Protocol (IP) address associated with the plurality of computing nodes providing different types of services which include at least a storage service and a Hypertext Transfer Protocol (HTTP) based service;
    selecting a first computing node in the plurality of computing nodes based on a set of selection criteria;
    assigning the IP address to the first computing node, thereby allowing a request based on the IP address for a respective service provided by the computing nodes to be directed to the first computing node; and
    facilitating a first service provided by the computing nodes based on the request.

2. The method of claim 1, wherein the plurality of computing nodes includes at least one storage server facilitating the storage service based on a storage application accessible via the IP address.

3. The method of claim 1, wherein the plurality of computing nodes includes at least one database server executing a database application accessible via the IP address.

4. The method of claim 1, further comprising sending a gratuitous address resolution protocol (ARP) request with the IP address to the client site for clearing a respective local ARP cache.

5. The method of claim 1, further comprising:
    performing a monitoring service to determine operational status of the different types of services; and
    in response to determining a disruption to a service, restarting the service.

6. The method of claim 5, wherein the disrupted service is the first service, and wherein the method further comprises un-hosting the IP address from the first computing node.

7. The method of claim 6, further comprising:
    initiating a lock on the monitoring service;
    performing a clean-up operation on the IP address; and
    restarting the monitoring service.

8. The method of claim 1, further comprising:
    selecting a second computing node in the cluster of computing nodes for hosting the first IP address; and un-hosting the IP address from the first computing node, thereby allowing the second computing node to host the IP address.

9. The method of claim 1, further comprising
determining whether the IP address is duplicated among the plurality of computing nodes; and
in response to detecting duplication, indicating an error associated with the allocation of the IP address.

10. The method of claim 1, wherein the selection criteria are based on one or more of:
a lowest address value of a computing node;
a highest address value of the computing node;
a type of service hosted by the computing node;
a load on computing node load; and
a random selection.

11. A non-transitory computer-readable storage medium storing instructions that when executed by a computing system cause the computing system to perform a method for managing services provided by a plurality of computing nodes, the method comprising:
identifying an Internet Protocol (IP) address associated with the plurality of computing nodes providing different types of services which include at least a storage service and a Hypertext Transfer Protocol (HTTP) based service;
selecting a first computing node in the plurality of computing nodes based on a set of selection criteria;
assigning the IP address to the first computing node, thereby allowing a request based on the IP address for a respective service provided by the computing nodes to be directed to the first computing node; and
facilitating a first service provided by the computing nodes based on the request.

12. The non-transitory computer-readable storage medium of claim 11, wherein the plurality of computing nodes includes at least one storage server facilitating the storage service based on a storage application accessible via the IP address.

13. The non-transitory computer-readable storage medium of claim 11, wherein the plurality of computing nodes includes at least one database server executing a database application accessible via the IP address.

14. The non-transitory computer-readable storage medium of claim 11, wherein the method further comprises sending a gratuitous address resolution protocol (ARP) request with the IP address to the client site for clearing a respective local ARP cache.

15. The non-transitory computer-readable storage medium of claim 11, wherein the method further comprises:
performing a monitoring service to determine operational status of the different types of services; and
in response to determining a disruption to a service, restarting the service.

16. The non-transitory computer-readable storage medium of claim 15, wherein the disrupted service is the first service, and wherein the method further comprises un-hosting the IP address from the first computing node.

17. The non-transitory computer-readable storage medium of claim 16, wherein the method further comprises:
initiating a lock on the monitoring service;
performing a clean-up operation on the IP address; and
restarting the monitoring service.

18. The non-transitory computer-readable storage medium of claim 11, wherein the method further comprises:
selecting a second computing node in the cluster of computing nodes for hosting the first IP address; and
un-hosting the IP address from the first computing node, thereby allowing the second computing node to host the IP address.

19. The non-transitory computer-readable storage medium of claim 11, wherein the method further comprises:
determining whether the IP address is duplicated among the plurality of computing nodes; and
in response to detecting duplication, indicating an error associated with the allocation of the IP address.

20. A computing node in a plurality of computing nodes, comprising:
a processor;
a storage device; and
a memory coupled to the processor and storing instructions, which when executed by the processor cause the processor to perform a method for managing services provided by the plurality of computing nodes, the method comprising:
identifying an Internet Protocol (IP) address associated with the plurality of computing nodes providing different types of services which include at least a storage service and a Hypertext Transfer Protocol (HTTP) based service;
selecting the computing node in the plurality of computing nodes based on a set of selection criteria;
assigning the IP address to the computing node, thereby allowing a request based on the IP address for a respective service provided by the computing nodes to be directed to the computing node; and
facilitating a first service provided by the computing nodes based on the request.

* * * * *